United States Patent
Arasawa et al.

(10) Patent No.: US 7,159,304 B2
(45) Date of Patent: Jan. 9, 2007

(54) METHOD OF MANUFACTURING A SPIN-VALVE GIANT MAGNETORESISTIVE HEAD

(75) Inventors: Masatoshi Arasawa, Odawara (JP); Haruko Tanaka, Nakai (JP); Makoto Morijiri, Ninomiya (JP); Koichi Nishioka, Hiratsuka (JP); Shuichi Kojima, Hiratsuka (JP); Masayasu Kagawa, Hiratsuka (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 64 days.

(21) Appl. No.: 10/778,079

(22) Filed: Feb. 17, 2004

(65) Prior Publication Data

US 2004/0158973 A1 Aug. 19, 2004

Related U.S. Application Data

(62) Division of application No. 09/931,255, filed on Aug. 17, 2001, now Pat. No. 6,717,778.

(30) Foreign Application Priority Data

Nov. 28, 2000 (JP) .............................. 2000-365771

(51) Int. Cl.
*G11B 5/127* (2006.01)
*H04R 31/00* (2006.01)

(52) U.S. Cl. ............................... 29/603.16; 29/603.07; 29/603.13; 29/603.14; 29/603.15; 29/603.18; 216/62; 216/65; 216/66; 257/344; 360/324.1; 360/324.11; 360/324.12; 360/324.2; 427/127; 427/128; 438/301; 438/706

(58) Field of Classification Search ............. 29/603.07, 29/603.13–603.16, 603.18; 216/62, 65, 66; 427/127, 128; 360/324.1, 324.2, 324.11, 360/324.12; 257/344; 438/301, 706
See application file for complete search history.

(56) References Cited

U.S. PATENT DOCUMENTS 5,120,668 A * 6/1992 Hsu et al. .................... 438/301

(Continued)

FOREIGN PATENT DOCUMENTS

EP 0727773 A1 2/1996

(Continued)

OTHER PUBLICATIONS

"Performance of yoke type GMR heads"; Folkerts, W.; Kools, J.C.S.; de Nooijer, M.C.; Ruigrok, J.J.M.; Postma, L.; Lenssen, K.M.H.; Somers, G.H.J.; Coehoorn, R.; Magnetics, IEEE Transactions; Nov. 1995; pp. 2591-2596.*

*Primary Examiner*—Paul D. Kim
(74) *Attorney, Agent, or Firm*—Antonelli, Terry, Stout and Kraus, LLP.

(57) ABSTRACT

Multiple thin films of spin-valve GMR sensor are formed in a trapezoidal cross-sectional shape by laminating an antiferromagnetic layer, a pinned magnetic layer, a nonmagnetic conductive layer, a free magnetic layer and a nonmagnetic protective layer on a lower insulated gap layer. The amount of etching of the lower insulated gap layer produced in the process of patterning the spin-valve giant magnetoresistive layers into the multiple thin films of spin-valve GMR sensor is 10 nm or less. Further, the angle θ which the tangent line of each side face of the multiple thin films to the middle line of the free magnetic layer in its thickness direction forms with respect to the middle line of the free magnetic layer becomes 45 degrees or more. This structure makes it possible to provide such a spin-valve giant magnetoresistive head that it meets the requirements for securing constant breakdown voltage and preventing instability of MR output voltage waveform.

14 Claims, 18 Drawing Sheets

U.S. PATENT DOCUMENTS

| | | |
|---|---|---|
| 5,739,990 A | 4/1998 | Ravipati et al. |
| 6,052,261 A * | 4/2000 | Watanabe et al. ........ 204/192.1 |
| 6,437,950 B1 | 8/2002 | Chau et al. |
| 6,466,419 B1 | 10/2002 | Mao |
| 6,605,414 B1 * | 8/2003 | Watanabe et al. ........... 430/319 |

FOREIGN PATENT DOCUMENTS

| | | | |
|---|---|---|---|
| JP | 58016527 A * | 1/1983 | |
| JP | 63149603 A * | 6/1988 | |
| JP | 08-167124 | 6/1996 | |
| JP | 08-221719 | 8/1996 | |
| JP | 09-044816 | 2/1997 | |
| JP | 10-247306 | 9/1998 | |
| JP | 11-224411 | 8/1999 | |
| JP | 11-259816 | 9/1999 | |
| JP | 2000-113416 | 4/2000 | |
| JP | 2000-182220 | 6/2000 | |
| JP | A-2000-215424 | 8/2000 | |
| JP | 2001-291913 | 10/2001 | |

* cited by examiner

FIGURE: END-PART INCLINED ANGLE OF FREE MAGNETIC LAYER
AND EXCESS AMOUNT OF INTRUSION OF MILLING WIDTH OF TAPER PART

FIGURE:RELATIONSHIP BETWEEN END-PART INCLINED ANGLE OF FREE MAGNETIC LAYER AND BHN DEFECT RATE

FIGURE: RELATIONSHIP BETWEEN RESIDUAL FILM THICKNESS OF LOWER INSULATED GAP LAYER AND BREAKDOWN VOLTAGE DEFECT RATE

METHOD OF MANUFACTURING A SPIN-VALVE GIANT MAGNETORESISTIVE HEAD

CROSS-REFERENCE TO RELATED APPLICATIONS

This application is a division of application Ser. No. 09/931,255 filed on Aug. 17, 2001, now U.S. Pat. No. 6,717,778. The contents of application Ser. No. 09/931,255 are hereby incorporated herein by reference in their entirety.

BACKGROUND OF THE INVENTION

1. Field of the Invention

The present invention relates to a spin-valve giant magnetoresistive head for reproducing magnetic information written in a minute single domain on a magnetic recording medium in a magnetic recording apparatus for use in a computer, an information processing apparatus and the like. In particular, the present invention relates to a spin-valve giant magnetoresistive head and its manufacturing method suitably used to prevent instability of magnetoresistive (MR) output voltage waveform caused by Barkhausen noise and obtain adequate MR output voltage, especially in a narrow-track head necessary to achieve high-density magnetic recording.

2. Description of the Related Art

A thin-film magnetic head for writing and reading magnetic information is a key device to a magnetic recording apparatus. The thin-film magnetic head consists of a inductive write head for writing magnetic information and a read head for reading out the magnetic information written in a recording medium.

The read head for reading out the magnetic information from the recording medium includes a magnetoresistive element showing a resistance change to a very weak magnetic field applied from the outside, or a giant magnetoresistive element showing a resistance change larger than that of the magnetoresistive element. The reproducing head also includes a conductive film for supplying sensing current for use in sensing the resistance change.

The spin-valve giant magnetoresistive head that shows a large MR ratio to an applied magnetic field to produce a resistance change to a very weak magnetic field includes multiple thin films of giant magnetoresistive (GMR) sensor. The multiple thin films of GMR sensor are composed of at least an antiferromagnetic layer, a pinned magnetic layer, a free magnetic layer, a nonmagnetic conductive spacer that achieves magnetic insulation between the pinned magnetic layer and the free magnetic layer, and a nonmagnetic protective layer. The spin-valve giant magnetoresistive head also includes magnetic-domain control layers that maintain the magnetic orientation of the free magnetic layer in such a state that it intersects at right angles to that of the pinned magnetic layer. Further, the spin-valve giant magnetoresistive includes a conductive layer that supplies sensing current to the multiple thin films of GMR sensor to sense the resistance change.

In the spin-valve giant magnetoresistive head, a magnetic field necessary for magnetic-domain control is applied to the free magnetic layer to make a single domain of the free magnetic. This technique is important for preventing instability of MR output voltage waveform caused by Barkhausen noise.

FIG. 11 shows an exemplary cross-sectional structure of a conventional spin-valve giant magnetoresistive head as seen from the side opposite to magnetic recording media. First, a lower magnetic shield layer 41 is formed, and a lower insulated gap layer 42 is formed on the lower magnetic shield layer 41. Then, on the lower insulated gap layer 42, multiple thin films of GMR sensor D2 are formed in a trapezoidal cross-sectional shape. The multiple thin films of GMR sensor D2 are composed of an antiferromagnetic layer 1, a pinned magnetic layer 2 formed on the border of the antiferromagnetic layer so that its magnetic orientation can be aligned in a fixed direction, a free magnetic layer 4, a nonmagnetic conductive spacer 3 that achieves magnetic insulation between the pinned magnetic layer 2 and the free magnetic layer 4, and a nonmagnetic protective layer 5.

Magnetic-domain control layers 9 are formed on the side inclined parts of the multiple thin films of GMR sensor D2 and the lower insulated gap layer 42. The magnetic-domain control layers 9 make the magnetic orientation of the free magnetic layer 4 aligned in such a direction that it intersects at right angles to the magnetic orientation of the pinned magnetic layer 2. Base material layers 8 for the respective magnetic-domain control layers 9 are formed under the magnetic-domain control layers 9. Conductive layers 11 for supplying sensing current to the multiple thin films of GMR sensor to sense a magnetic resistance change are formed above the magnetic-domain control layers 9 through base material layers 10 for the respective conductive layers 11. An upper insulated gap layer 47 and an upper magnetic shield layer 48 are formed over the multiple thin films of GMR sensor D2 and the conductive layers 11.

In such a spin-valve giant magnetoresistive head, a magnetic field enough for magnetic-domain control is applied to the free magnetic layer 4, which makes it possible to prevent generation of Barkhausen noise, and hence instability of MR output voltage waveform. Thus a stable head can be provided.

One approach to reducing Barkhausen noise to prevent instability of MR output voltage waveform is described, for example, in JP-A-2000-215424. This publication presents such a structure that a flat part of a hard-bias layer having larger thickness than that of a free magnetic layer is positioned in the thickness direction of the free magnetic layer at the same level as the free magnetic layer. The free magnetic layer corresponds to the above-mentioned free magnetic layer 4. The generation of instable MR output, however, cannot be prevented by this approach alone.

SUMMARY OF THE INVENTION

It is an object of the present invention to provide a spin-valve giant magnetoresistive head and its manufacturing method capable of restraining instability of MR output voltage waveform.

To prevent generation of an instable MR output voltage waveform in a spin-valve giant magnetoresistive head, we directed our attention to the inclined angles of end parts of the free magnetic layer of end parts of multiple thin films of GMR sensor. We created spin-valve giant magnetoresistive heads with varied and inclined angles of end parts of the free magnetic layer of GMR sensor and measured the probability of occurrence of an instable MR output voltage waveform. Experimentally, it becomes apparent from the results of the measurement that variations in inclined angles of the end parts of the free magnetic layer of GMR sensor vary the probability of instability of MR output waveform caused by Barkhausen noise. It was found that the end parts of the multiple thin films of GMR sensor should be so made that the angle which the tangent line of each end inclined part to the middle line of the free magnetic layer in its thickness direction forms with respect to the middle line of the free magnetic layer is 45 degrees or more.

It is true that the tangent line of each inclined end part of the multiple thin films of GMR sensor to the middle line of the free magnetic layer in its thickness direction should form an angle of 45 degrees or more with respect to the middle line of the free magnetic layer, regardless of whether the antiferromagnetic layer in the giant magnetoresistive thin films is of one-layer or two-layer structure.

To make the inclined angles of the end parts of the free magnetic layer of the multiple thin films of GMR sensor form an angle of 45 degrees or more, after giant magnetoresistive thin films are formed, over etching is conducted onto the giant magnetoresistive thin films by ion milling or the like using a mask pattern such as a resist mask pattern. Thus the inclined end parts can form an angle of 45 degrees or more. The term "over etching" denotes an etching process that takes a longer time than that required for etching of the above-mentioned giant magnetoresistive thin films. In this case, however, the lower magnetic gap film formed under the giant magnetoresistive thin films is also etched in this over etching process, the thickness of portions of the lower magnetic gap film directly under the openings of the photoresist mask pattern is reduced. The lower magnetic gap film is a nonmagnetic insulated film made of $Al_2O_3$ or $SiO_2$ or both. As this film becomes thin, breakdown voltage between the film such as the magnetic-domain control layer or the conductive layer and the lower shield layer is made small, which runs the danger of reducing the performance of the magnetic head.

Experiments on this point revealed that the amount of reduction in the thickness of the portion between the magnetic-domain control layer and the lower shield layer relative to the thickness of the lower insulated gap film directly under the giant magnetoresistive thin films should be 10 nm maximum. In other words, the difference between the thickness of the portions of the lower insulated gap layer directly under the giant magnetoresistive thin films and the thickness of the lower insulated gap layer sandwiched between the magnetic-domain control layer and the lower shield layer should be 10 nm or less. This means that the amount of over etching in the process of forming the multiple thin films of GMR sensor should be 10 nm or less.

In the process of creating such multiple thin films of GMR sensor, it was also found that the thickness of the photoresist pattern as a mask material for the etching has a great effect on the complete shape. As a result, it became apparent that it would be better if the photoresist pattern is formed by laminating a 0.01 to 0.05 μm thick organic film and a 0.1 to 0.35 μm thick resist film.

DETAILED DESCRIPTION OF THE EMBODIMENTS

Description will be made below about spin-valve giant magnetoresistive heads according to preferred embodiments of the present invention with reference to the accompanying drawings.

(First Embodiment)

Figure 1:
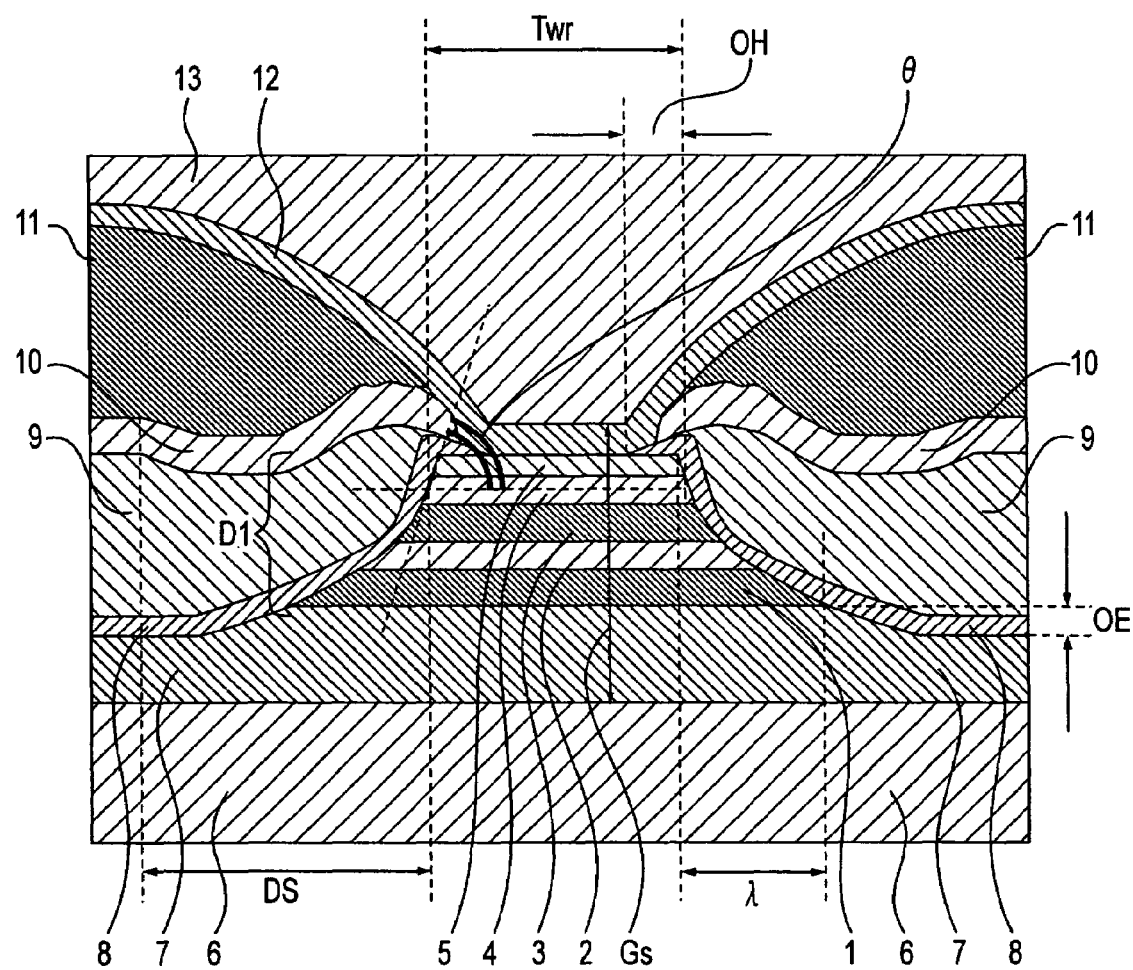
FIG. 1 shows a cross-sectional structure of a spin-valve giant magnetoresistive head according to a first embodiment of the present invention, as seen from the side opposite to recording media.

FIG. 1 shows the cross-sectional structure of a spin-valve giant magnetoresistive head according to the first embodiment of the present invention, as seen from the side opposite to recording media. As shown, an insulated protective layer is formed on a substrate made of ceramic or the like. A lower magnetic shield layer 6 is formed on the insulated protective layer. A lower insulated gap layer 7 that is a nonmagnetic film made of $Al_2O_3$ or $SiO_2$ or both is formed on the lower magnetic shield layer 6. An antiferromagnetic layer 1 made of PtMn and the like is formed on the lower insulated gap layer 7. The antiferromagnetic layer 1 is not of one-layer structure; it can be formed together with a base material layer made of Ta and the like in a multiple-layer structure. A pinned magnetic layer 2 made of NiFe and the like is formed on the border of the antiferromagnetic layer 1 so that its magnetic orientation can be aligned in a fixed direction. A free magnetic layer 4 made of NiFe and the like, and a nonmagnetic conductive spacer 3 which is made of Cu and the like to achieve magnetic insulation between the pinned magnetic layer 2 and the free magnetic layer 4 are formed above the antiferromagnetic layer 1. A nonmagnetic protective layer 5 is formed as the uppermost layer. Thus giant magnetoresistive thin films are formed.

The giant magnetoresistive thin films are patterned by etching such as ion milling method using a photoresist pattern as a mask pattern into multiple thin films of GMR sensor D1 to define the width of a reproducing track. The etching process can be controlled by an end point detector equipment, as is known in the art. Above the side inclined parts of the multiple thin films of GMR sensor D1 and the lower insulated gap layer 7, magnetic-domain control layers 9, base material layers 8 for the respective magnetic-domain control layers 9, conductive layers 22 and base material layers 10 for the respective conductive layers 11 are formed. The magnetic-domain control layers 9 is to align the magnetic orientation of the free magnetic layer 4 in such a direction that it intersects at right angles to the magnetic orientation of the pinned magnetic layer 2. The conductive layers 11 is to supply sensing current to the pinned magnetic layer 2, the nonmagnetic conductive layer 3 and the free magnetic layer 4 to sense a giant magnetic resistance change. An upper insulated gap layer 12 and an upper magnetic shield layer 13 are formed over the multiple thin films of GMR sensor Dl and the conductive layers 11.

The multiple thin films of GMR sensor D1 is arranged opposite to a magnetic recording medium to sense a very weak magnetic field from a minute single domain of the magnetic recording medium. In FIG. 1, the width of the middle line of the free magnetic layer 4 corresponds to the read track width Twr. A difference between the maximum thickness and the minimum thickness of the lower insulated gap layer 7 corresponds to the amount of over etching OE. The horizontal width of each side face of the multiple thin films of GMR sensor D1 corresponds to the milling width $\lambda$ of the taper part. The minimum gap Gs between the top face of the lower magnetic shield layer 6 and the bottom face of the upper magnetic shield layer 13 corresponds to the read gap length. The angle which the tangent line of each side face of the multiple thin films of GMR sensor D1 to the middle line of the free magnetic layer in its thickness direction forms with respect to the middle line of the free magnetic layer 4 corresponds to the inclined angles of each end part of the free magnetic layer 4. Making the inclined angle $\theta$ of each end part of the free magnetic layer 4 45 degrees or more means that the milling width $\lambda$ of the taper part is necessarily equal to or less than the total thickness of the multiple thin films of GMR sensor D1. It should be noted here that the pinned magnetic layer may be of laminated structure through a nonmagnetic intermediate layer.

Figure 12A:
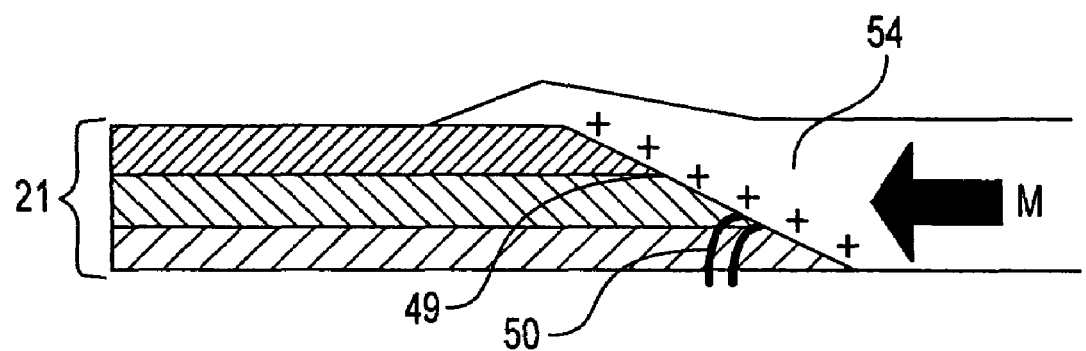
FIGS. 12A and 12B conceptual diagrams for explaining the principle of the present invention.
Figure 12B:
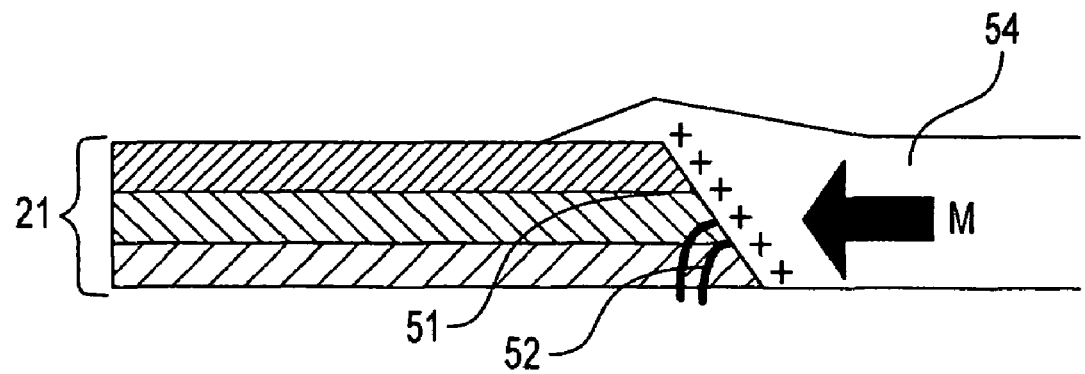

FIGS. 12A and 12B are conceptual diagrams showing cross sections of spin-valve giant magnetoresistive heads partly constituted of multiple thin films of GMR sensor 21 and a magnetic-domain control layer 54. If the magnetization of the magnetic-domain control layer 54 and the product of the residual magnetization and the magnetic thickness are kept constant, it can be considered that the pole density that appears in the end part contacting the free magnetic layer is proportional to the sine of the inclined angles of the end parts of the end part of the free magnetic layer. Therefore, it is assumed that as the inclined angles of the end parts of the free magnetic layer becomes steeper, magnetic instability can be reduced to prevent instability of MR output voltage waveform caused by Barkhausen noise. From this standpoint, it can be considered that it would be better if the inclined angles of the end parts of the free magnetic layer is steeper.

Figure 13:
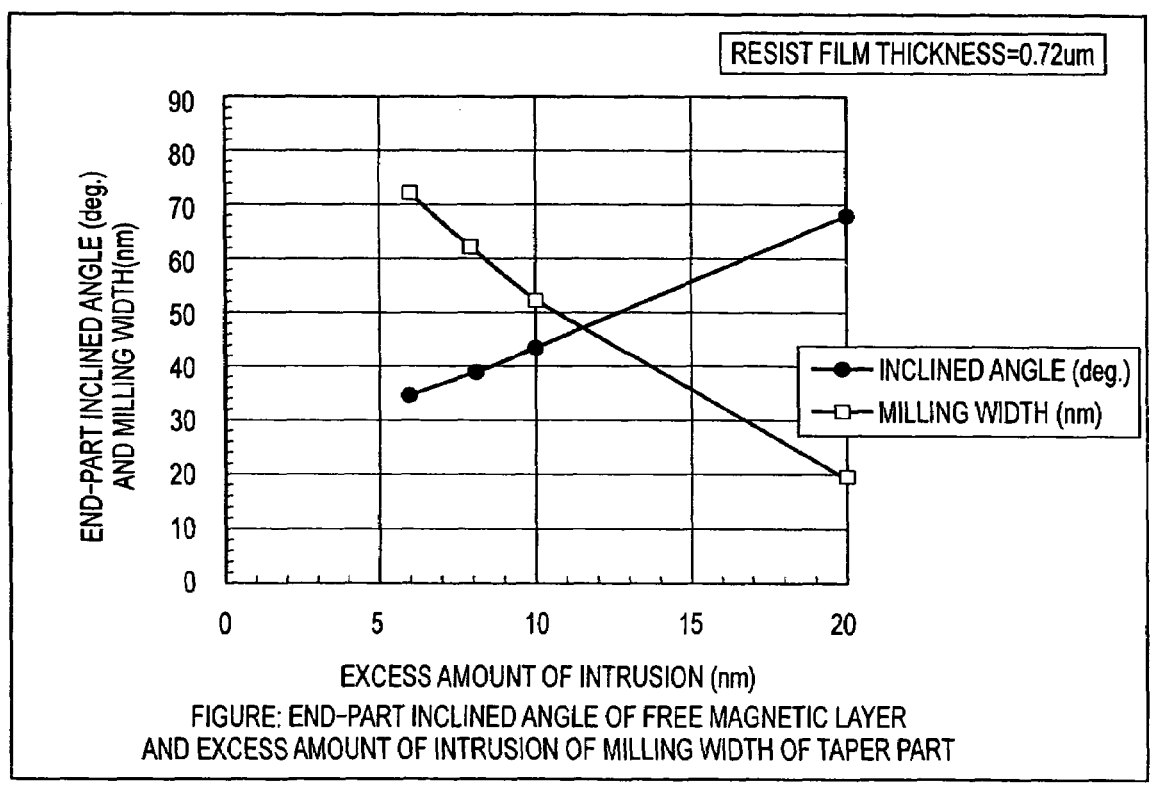
FIG. 13 is a graph showing a relationship between the amount of over milling and the angle which the tangent line of each side face of the laminated body to the middle of a free magnetic layer in its thickness direction forms with respect to the middle line of the free magnetic layer in the conventional manufacturing process.

To make sure of it, the amount of over etching was experimentally varied in the process of patterning the giant magnetoresistive thin films into the multiple thin films of GMR sensor D1 to obtain inclined angles of the end part of the free magnetic layer. FIG. 13 shows the results of checking the relationship between the amount of over etching and the inclined angles of the end parts of the free magnetic layer. It is apparent from FIG. 13 that the inclined angles of the end parts of the free magnetic layer of GMR sensor becomes steeper as the amount of over etching increases.

Figure 14:
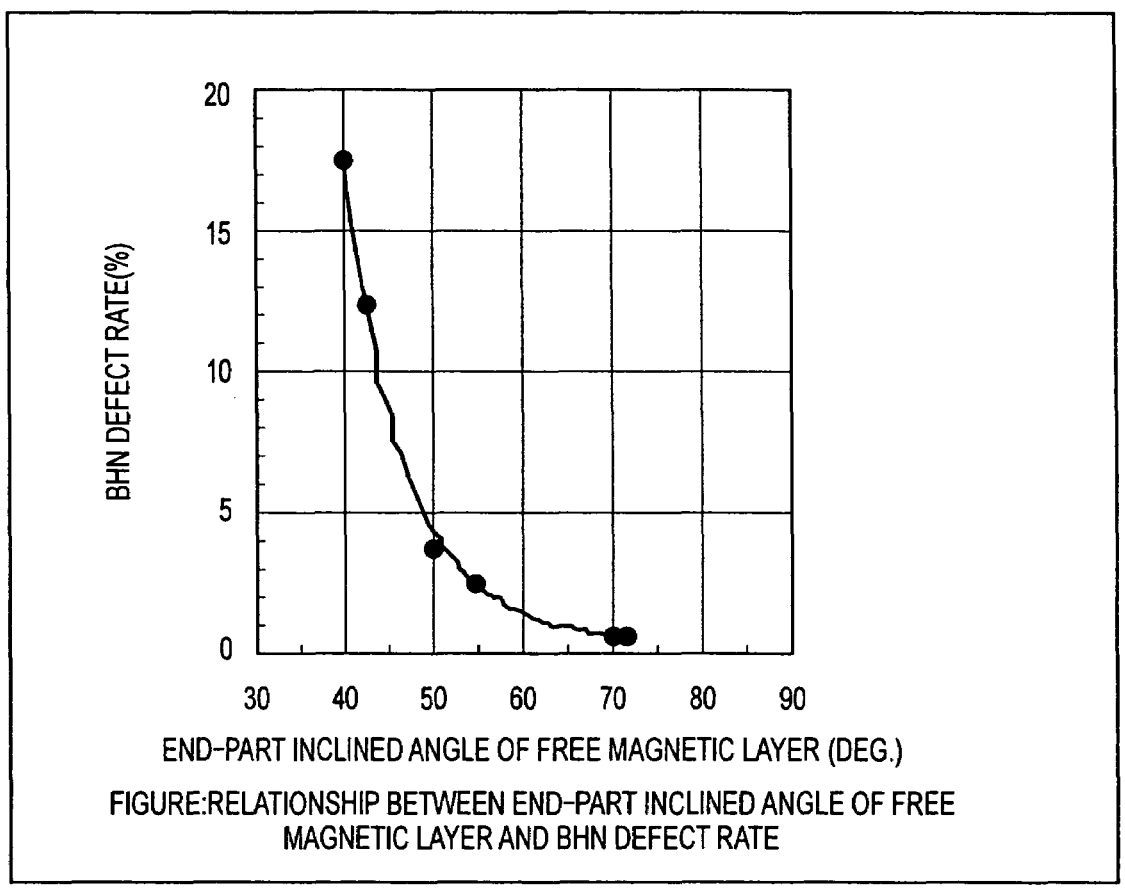
FIG. 14 is a graph showing a relationship between the angle which the tangent line of each side face of the laminated body to the middle line of the free magnetic layer in its thickness direction forms with respect to the middle line of the free magnetic layer, and the Barkhausen noise defect rate according to the embodiment of the present invention.

From this standpoint, trial manufacture models of elements were made by varying the amount of over etching to determine the probability of occurrence of an instable MR output waveform. FIG. 14 shows the results of the experiment. From the relationship between the Barkhausen noise and the inclined angles of the end parts of the free magnetic layer of GMR sensor shown in FIG. 14, it was experimentally confirmed that the Barkhausen noise defect rate is reduced as the inclined angles of the end parts of the free magnetic layer of GMR sensor becomes larger. Then, when the inclined angles of the end parts of the free magnetic layer of GMR sensor is 45 degrees or more, the Barkhausen noise defect rate becomes 10% or less.

Making of high BPI accompanied with the demand for high recording density tends to narrow the gap between the upper and lower shield layers. Making the gap narrower means that the upper and lower insulated gap layers need to be made thinner. In particular, when the giant magnetoresistive thin films are over-etched to form the multiple thin films of GMR sensor, the portions directly under the magnetic-domain control layers are made thinner than the initial film thickness. This causes such a problem that the breakdown voltage between the lower magnetic shield layer and the giant magnetoresistive thin films becomes too small.

Our experiments reveled that when the gap between the upper and lower shield layers of single spin-valve type was 0.1 µm, the thickness of the lower insulated gap layer became 30 nm, when the gap between the upper and lower shield layers of dual spin-valve type was 0.12 µm, the thickness of the lower insulated gap layer became 30 nm. Therefore, the thickness of the lower insulated gap layer was set to 30 nm to determine values of the film thickness of the portions of the lower insulated gap layer directly under the magnetic-domain control layers and associated breakdown defect rates.

Figure 15:
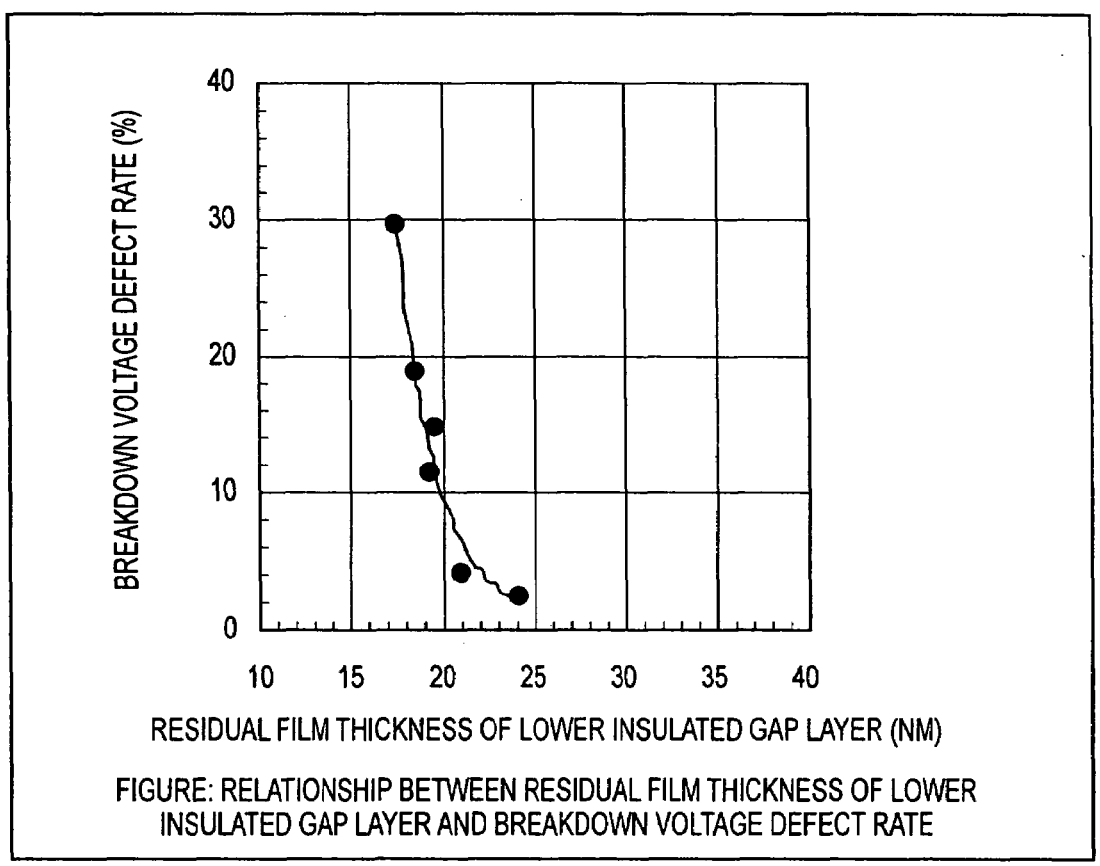
FIG. 15 is a graph showing a relationship between the residual film thickness of a lower insulated gap layer and the breakdown voltage according to the embodiment of the present invention.

FIG. 15 shows the results of checking the relationship between the film thickness of the lower insulated gap layer and the breakdown defect rate in such condition that the lower insulated gap layer of the spin-valve giant magnetoresistive head is 30 nm. From the experimental results, it became apparent that when the residual film thickness of the lower insulated gap layer is 20 nm or more, the breakdown defect rate stays at 10% or less. To secure a breakdown defect rate of 10% for electrical reliability, the giant magnetoresistive thin films can be over-etched up to 10 nm when the initial film thickness of the lower insulated gap layer is 30 nm.

From the above-mentioned experimental results, it was found that the optimum spin-valve giant magnetoresistive head that meets both requirements of magnetic reliability for preventing instability of MR output voltage waveform and electrical reliability for securing breakdown voltage has such a structure that the amount of over etching is 10 nm or less and the inclined angles of the end parts of the free magnetic layer of GMR sensor is 45 degrees or more. To realize such a structure of the spin-valve giant magnetoresistive head, we went back to the principle of ion milling.

Figure 8:
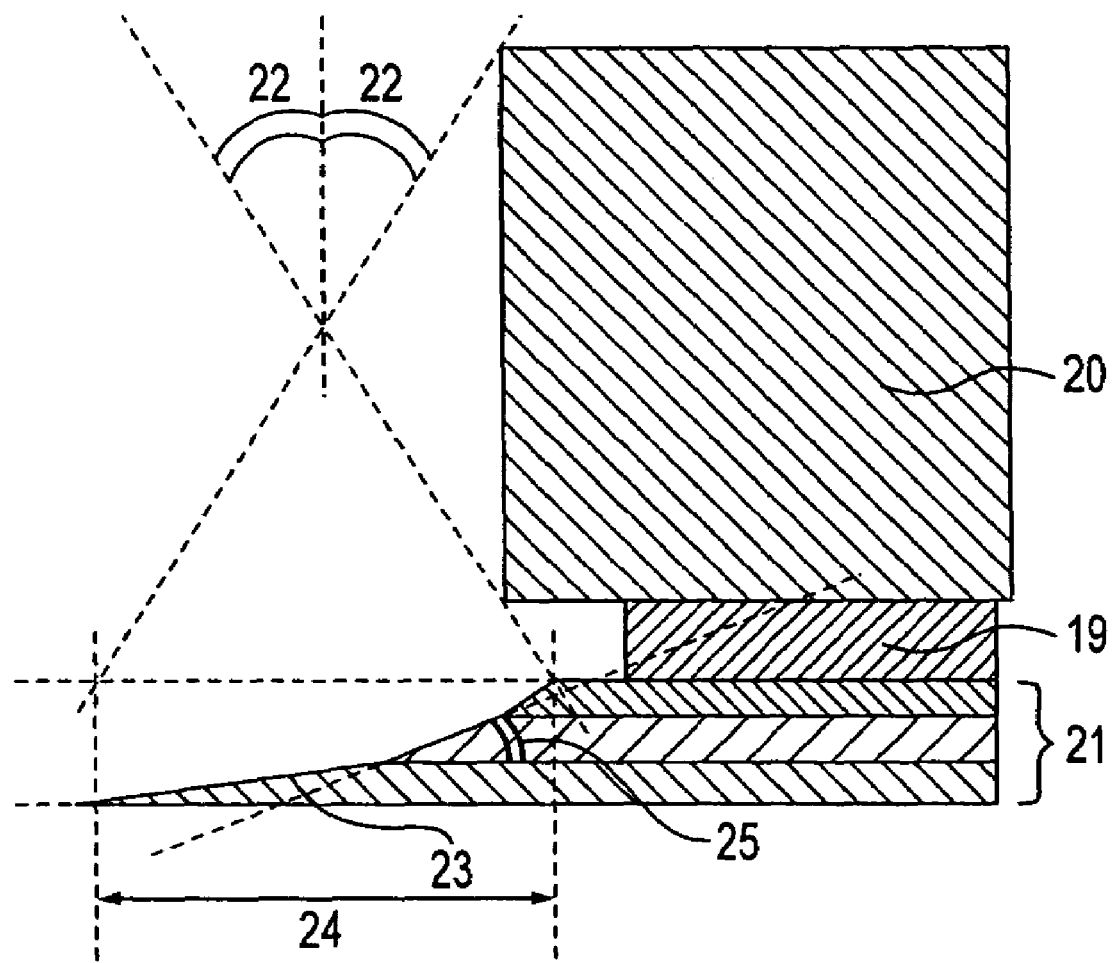
FIG. 8 is a cross-sectional view illustrating the process of patterning giant magnetoresistive thin films into a laminated body in the manufacture of a conventional spin-valve giant magnetoresistive heads as shown in FIG. 11.

FIG. 8 shows details of the process of creating the multiple thin films of GMR sensor 21 by ion milling. Ion milling is a method of irradiating an ion beam or the like to physically remove part of the multiple thin films of GMR sensor. In this process, the incident angle of the ion beam is not uniform, and some beam dispersion 22 occurs. For this reason, each end part of the multiple thin films of GMR sensor 21 is formed in a curved taper shape by means of a photoresist pattern 20 as a mask pattern and the dispersion angle 22 of the ion beam.

Figure 9:
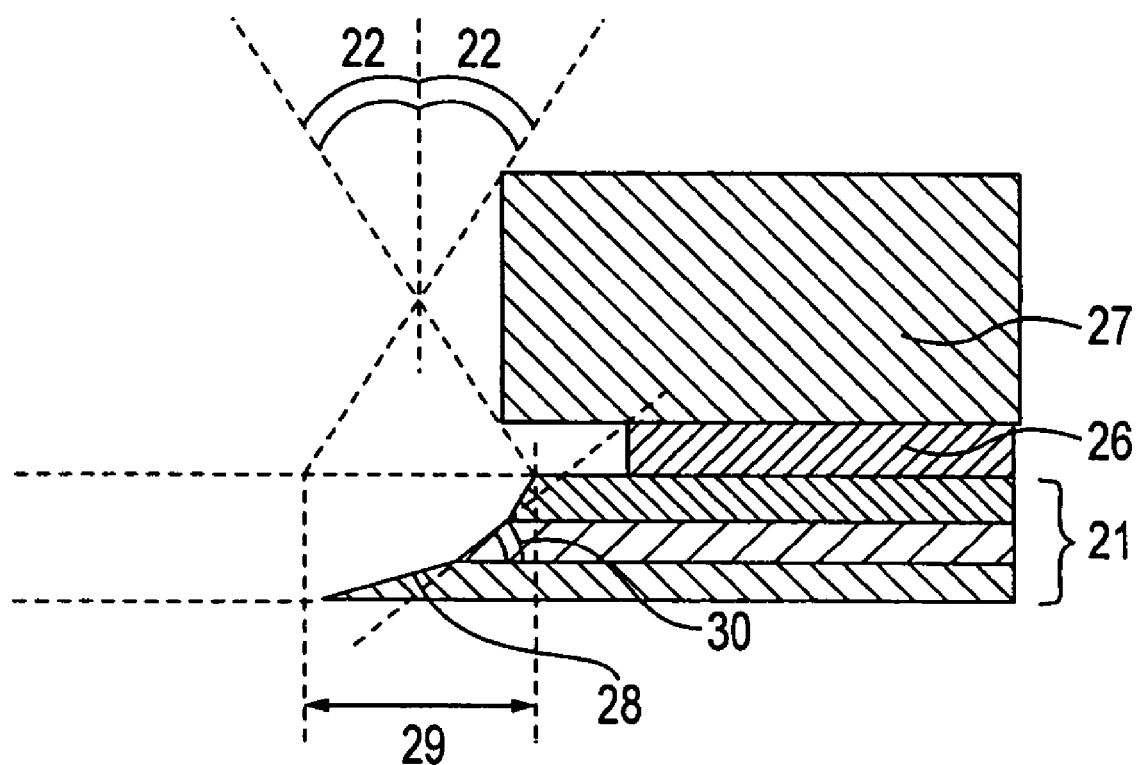
FIG. 9 is a cross-sectional view for explaining the process of manufacturing the spin-valve giant magnetoresistive head according to the present invention.

FIG. 9 shows a case where the organic film 26 and the resist film 27 are made thinner than those shown in FIG. 8. In this case, it is considered that the curved taper becomes shorter because of smaller shadow area of the ion beam. Such a structure reduces the milling width of the taper part as shown by the reference numeral 29 to make the inclined angles of the end parts of the free magnetic layer of GMR sensor of the free magnetic layer steeper as shown by the reference numeral 30.

Figure 16:
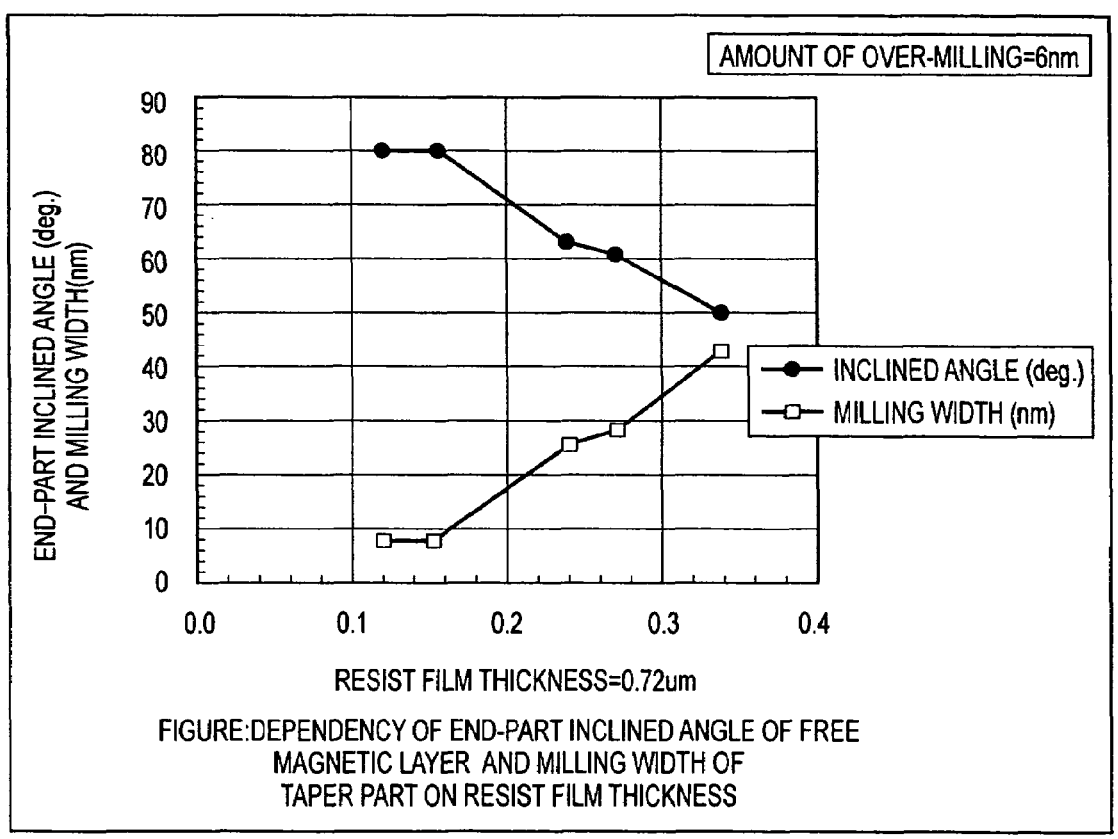
FIG. 16 is a graph showing a relationship among the thickness of a resist film, the angle which the tangent line of each side face of the laminated body to the middle line of the free magnetic layer in its thickness direction forms with respect to the middle line of the free magnetic layer, and the amount of milling width λ in a curved taper part of each side face of the laminated body according to the embodiment of the present invention.

FIG. 16 shows the experimental results of checking the relationship among the resist film thickness of a mask pattern M1, the inclined angles of the end parts of the free magnetic layer of GMR sensor, and the milling width of the taper part in such condition that the amount of over etching is 6 nm. From the experimental results, it was found that when the thickness of the resist film was 0.35 μm, the inclined angles of the end parts of the free magnetic layer of GMR sensor became 45 degrees or more, with the milling width of the taper part kept equal to or less than the total thickness (50 nm) of the multiple thin films of GMR sensor D1.

Figure 2:
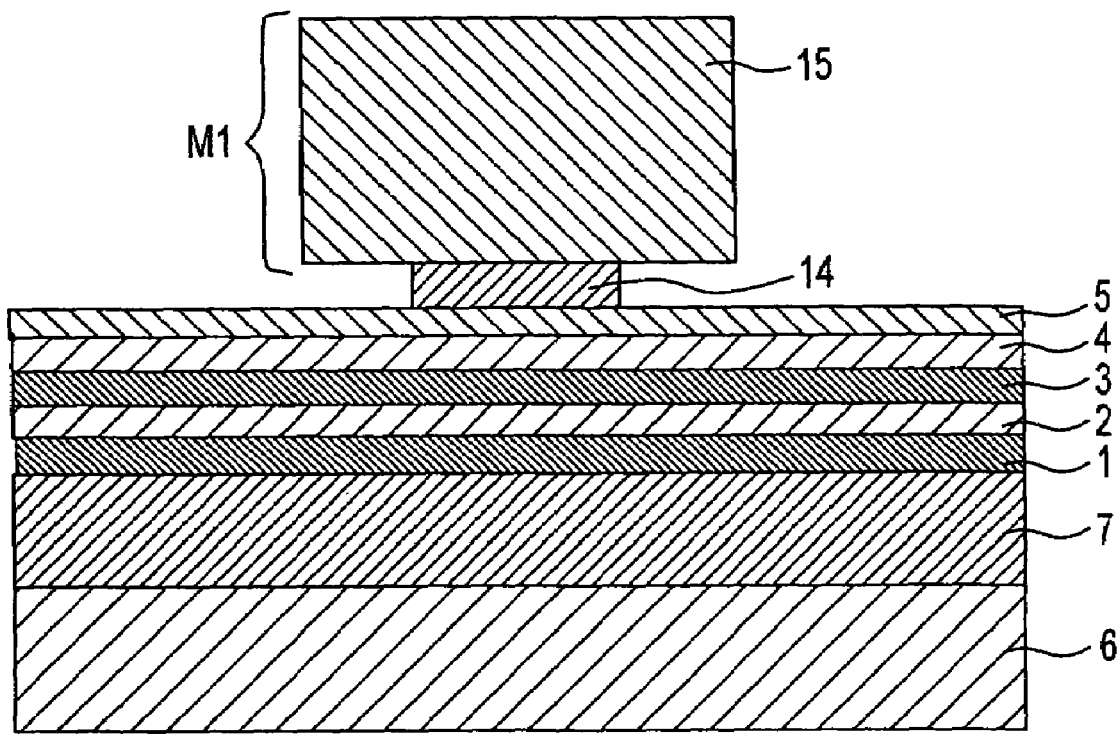
FIG. 2 is a cross-sectional view illustrating the process of forming a resist mask pattern in the manufacture of spin-valve giant magnetoresistive heads as shown in FIGS. 1 and 18.

To manufacture the spin-value giant magnetoresistive head of FIG. 1, the lower magnetic shield layer 6 and the lower insulated gap layer 7 are formed on the substrate as shown in FIG. 2. Then, the base material film 100, the antiferromagnetic layer 1, the pinned magnetic layer 2, the nonmagnetic conductive layer 3, the free magnetic layer 4 and the nonmagnetic protective layer 5 are laminated in this order. Then, the 0.01 to 0.05 μm thick organic film and the 0.1 to 0.35 μm thick resist film 15 are formed on the nonmagnetic protective layer 5 to form the mask pattern M1 in such an undercut shape that the portions directly under the resist film 15 intrudes 0.15 μm or less inwardly by means of exposure and developing treatment.

Figure 3:
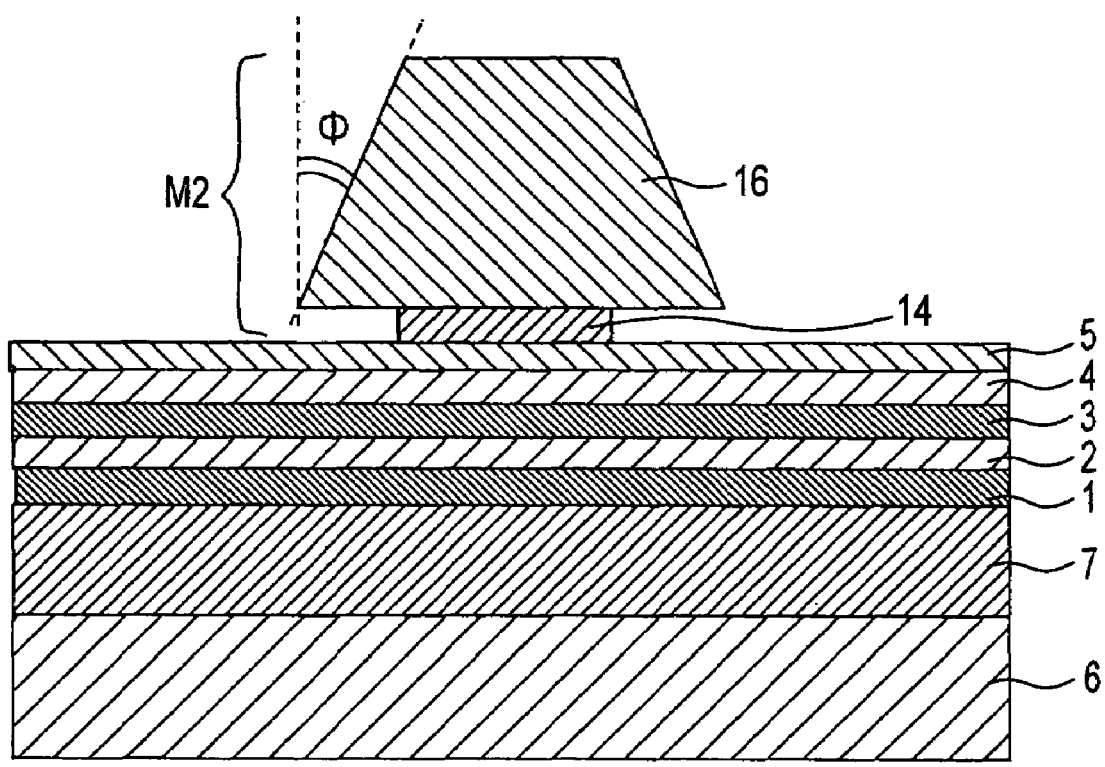
FIG. 3 is a cross-sectional view illustrating the process of forming a resist mask pattern in the manufacture of the spin-valve giant magnetoresistive heads as shown in FIGS. 1 and 18.
Figure 4:
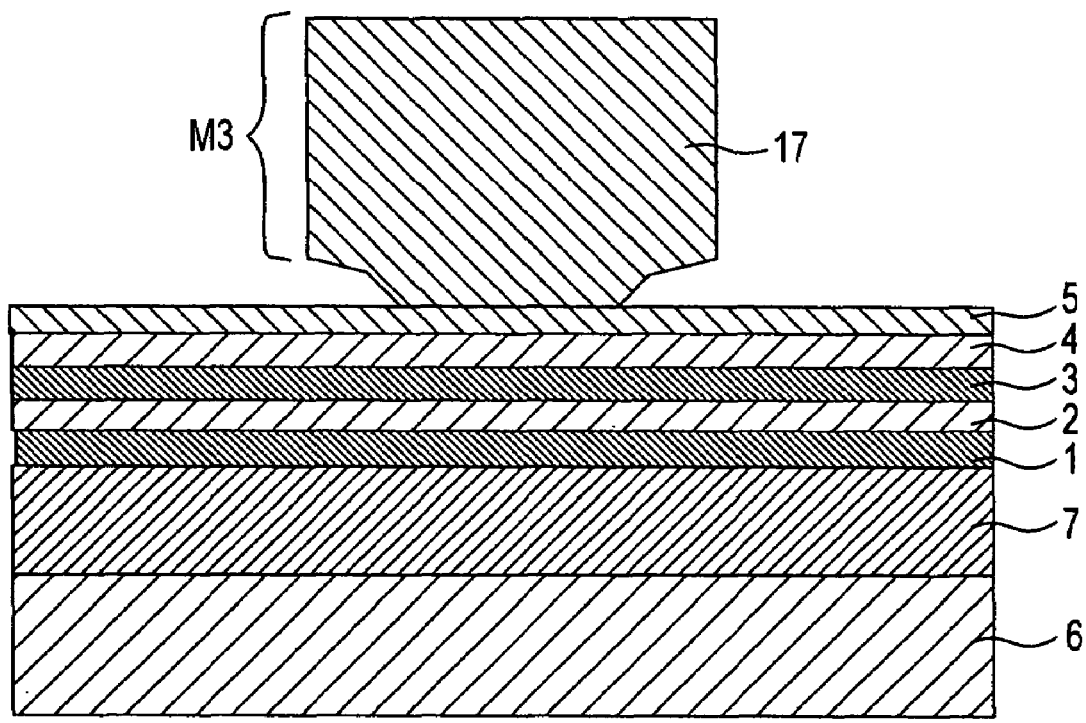
FIG. 4 is a cross-sectional view illustrating the process of forming a resist mask pattern in the manufacture of the spin-valve giant magnetoresistive heads as shown in FIGS. 1 and 18.
Figure 10:
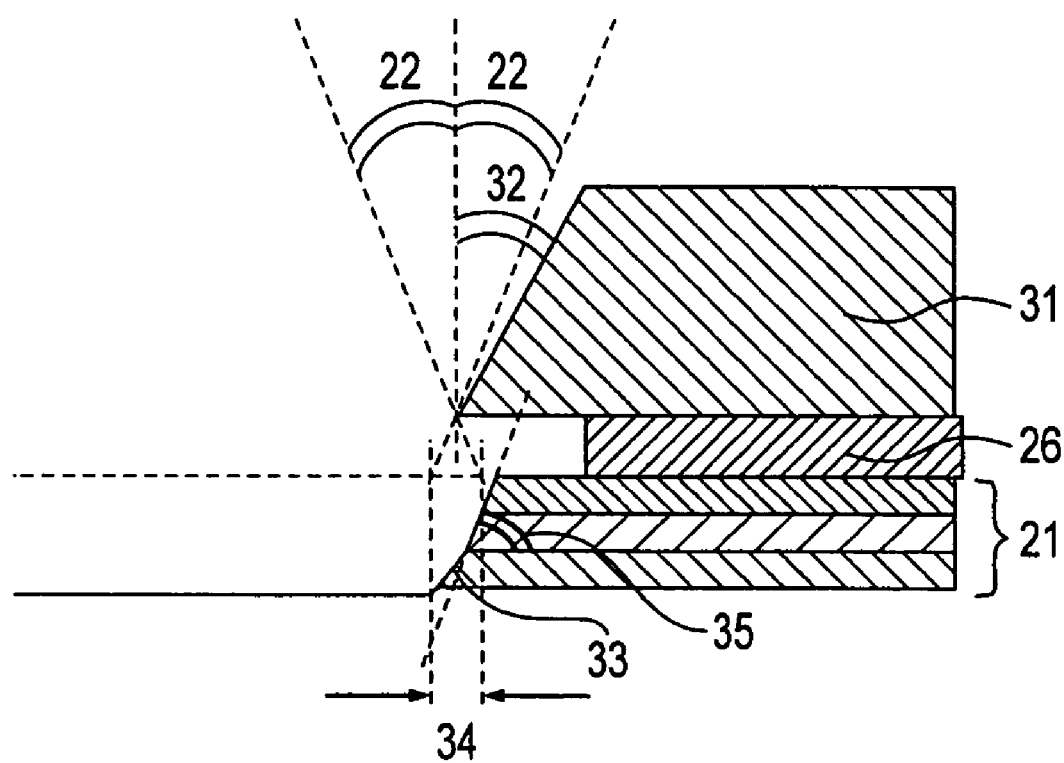
FIG. 10 is a cross-sectional view for explaining the process of manufacturing the spin-valve giant magnetoresistive head according to another embodiment of the present invention.
Figure 11:
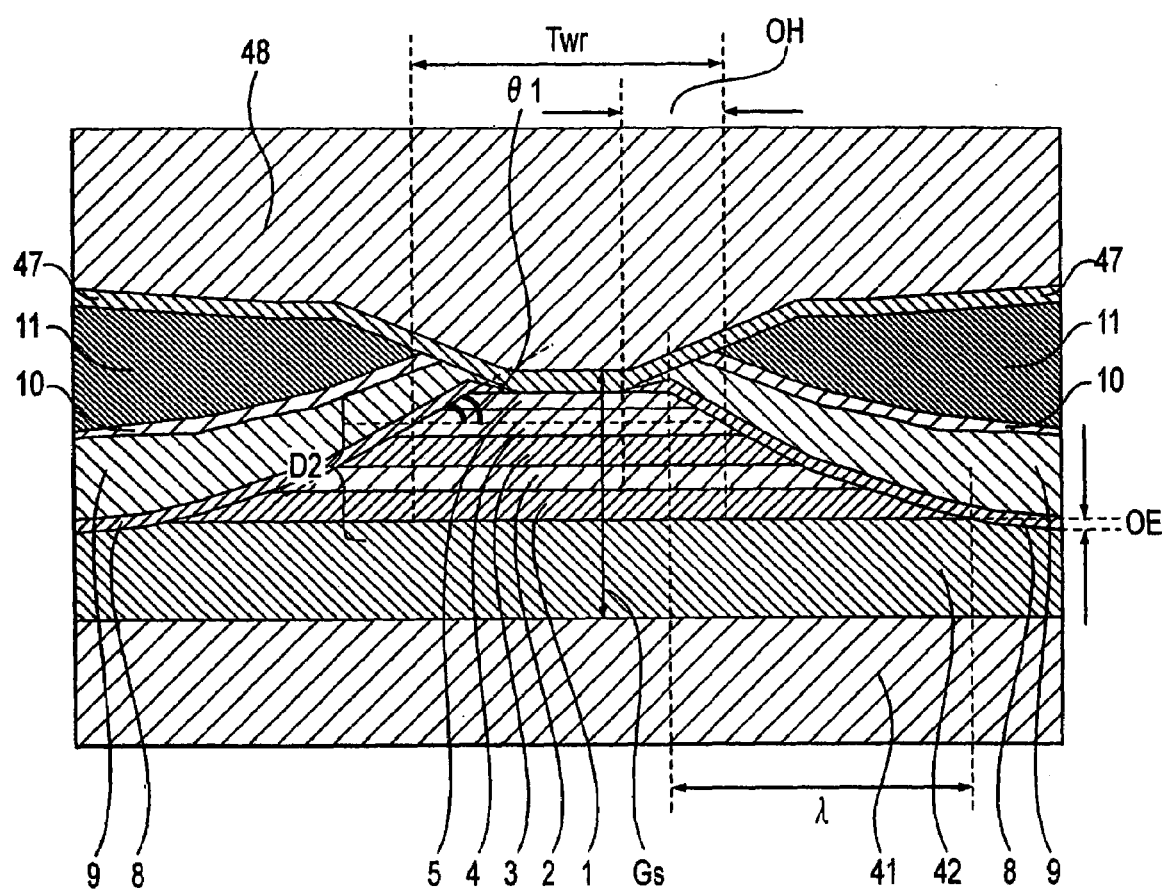
FIG. 11 shows a cross-sectional structure of the conventional spin-valve giant magnetoresistive head as seen from the side opposite to the recording media.

At this time, the resist film 16 may have a trapezoidal cross-sectional shape as shown in FIG. 3. As shown in FIG. 10, if a resist film 31 is trapezoidal in cross section, and the angle 32 which the resist film 31 forms with respect to the vertical direction is larger than the angle of beam dispersion 22, the inclined angles of the end parts of the free magnetic layer of GMR sensor becomes far steeper. In general, since the angle of beam dispersion is about three degrees, it is preferable that the above-mentioned angle 32 is three degrees or more.

Figure 6:
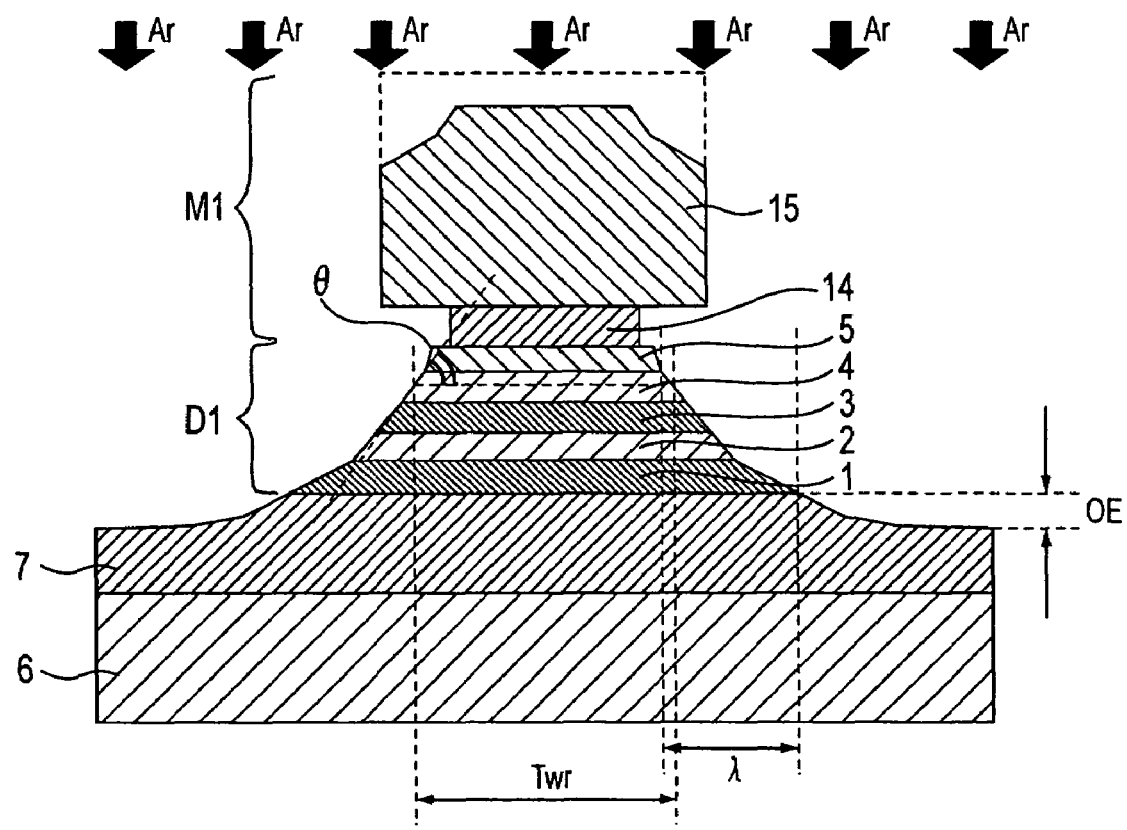
FIG. 6 is a cross-sectional view illustrating the process of patterning giant magnetoresistive thin films into a laminated body in the manufacture of the spin-valve giant magnetoresistive heads as shown in FIGS. 1 and 18.
Figure 7:
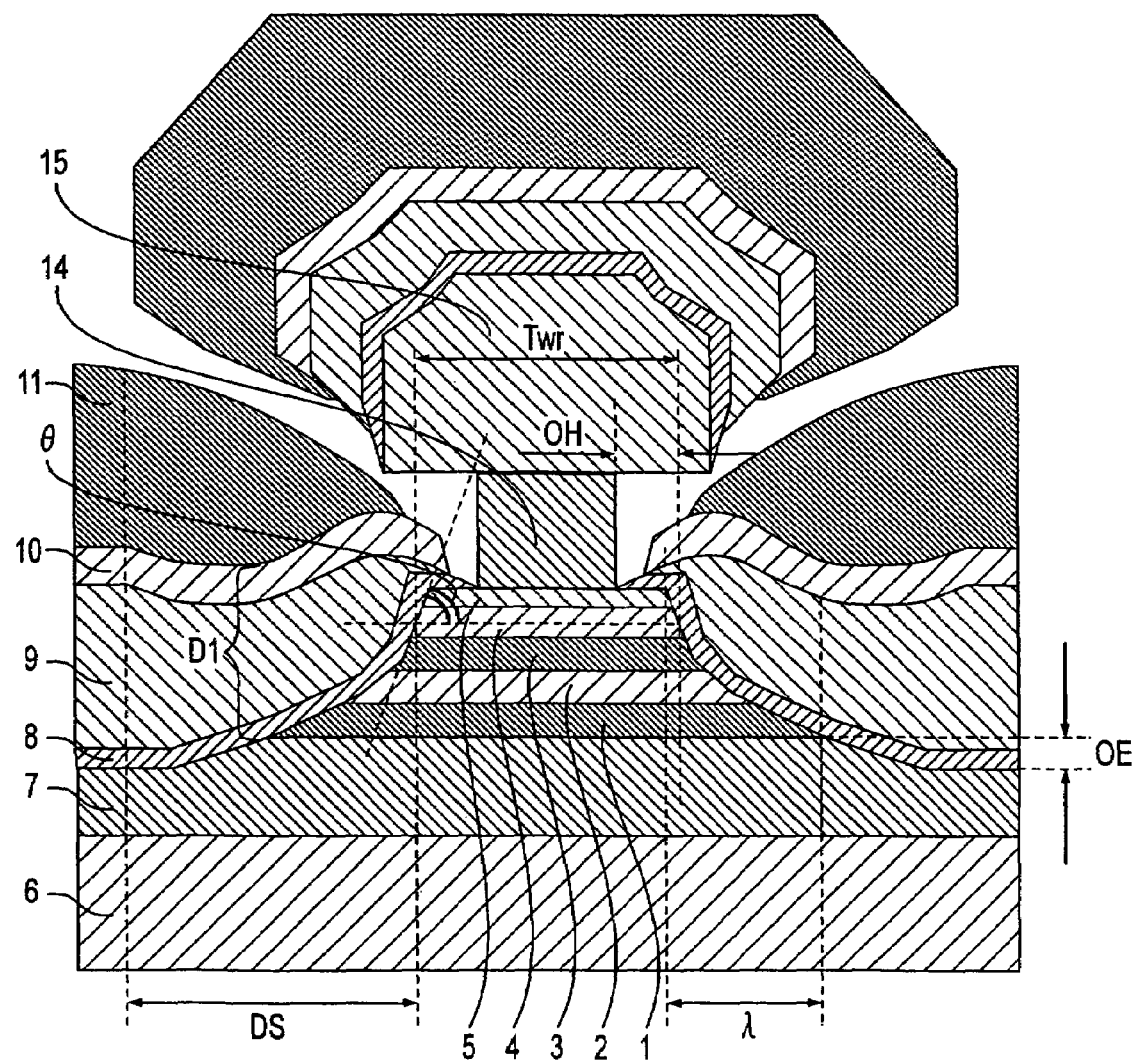
FIG. 7 is a cross-sectional view illustrating the process of forming magnetic-domain control layers and conductive layers in the manufacture of the spin-valve giant magnetoresistive heads as shown in FIGS. 1 and 18.

Then, as shown in FIG. 6, the portions that are not covered with the mask pattern M1 are etched by ion milling while limiting the amount of over etching OE to 10 nm or less. Then, the etched portions are patterned into the multiple thin films of GMR sensor with the inclined angles of the end parts of the free magnetic layer of GMR sensor being 45 degrees or more. Then, as shown in FIG. 7, the base material layers 8, the magnetic-domain control layers 9, the base material layers 10 and the conductive layers 11 are formed in this order above the uncovered portions of the lower insulated gap layer 7 formed by patterning the multiple thin films of GMR sensor D1, the inclined end parts of the multiple thin films of GMR sensor D1 and the mask pattern M1. After that, the mask pattern M1 is lift off and removed, thus obtaining the cross-sectional structure of the spin-valve giant magnetoresistive head of FIG. 1.

The resist material forming the mask pattern M1 can be a photoresist capable of pattern formation of 0.35 μm or less thin resist film. For example, a resist having the property of permitting patterning with an exposure wavelength of 365 nm, 248 nm or 193 nm, or a resist having the property of permitting patterning with an electron beam.

The electron-beam lithography and the photolithography can also be used in combination. For example, a resist having the property of permitting patterning with a combination of the exposure wavelength of 365 nm and the electron beam, or a combination of the exposure wavelength of 248 nm and the electron beam can be used.

(Second Embodiment)

Figure 18:
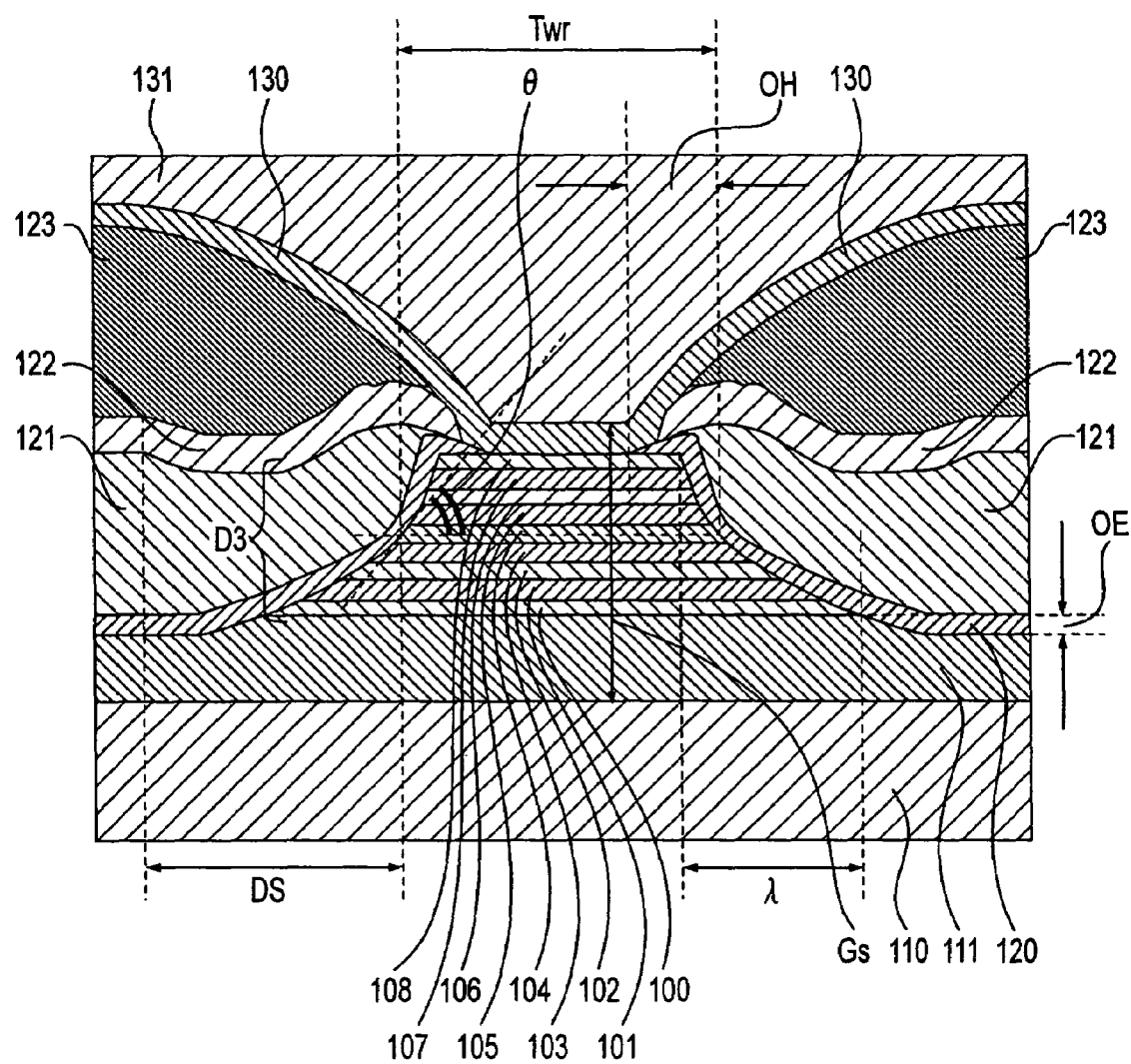
FIG. 18 shows the cross-sectional structure of the dual spin-valve giant magnetoresistive head according to the present invention, as seen from the side opposite to the recording media.

FIG. 18 shows an exemplary cross-sectional structure of a spin-valve giant magnetoresistive head according the second embodiment of the present invention, as seen from the side opposite to the recording media. This embodiment differs from the first embodiment in that such a spin-valve giant magnetoresistive head as shown in FIG. 1 contains multiple thin films of GMR sensor D3. The multiple thin films of GMR sensor D3 is made by laminating a base material layer 100, an antiferromagnetic layer 101 made of PtMn and the like, a pinned magnetic layer 102 made of NiFe and the like and formed on the border of the antiferromagnetic layer 101 so that its magnetic orientation can be aligned in a fixed direction, a nonmagnetic conductive spacer 103 which is made of Cu and the like to achieve magnetic insulation between the pinned magnetic layer 102 and a free magnetic layer 104, the free magnetic layer 104 made of NiFe and the like, a nonmagnetic conductive layer 105 made of Cu and the like, a pinned magnetic layer 106 made of NiFe and the like, an antiferromagnetic layer 107 made of PtMn and the like, and a nonmagnetic protective layer 108 made of Ta and the like in this order. The above-mentioned pinned magnetic layers may be of multiple-layer structure through respective nonmagnetic intermediate layers. This type of multiple thin films D3 is of so-called dual spin-valve structure.

Our experiment on the dual spin-valve giant magnetoresistive head revealed that when the gap between the upper and lower shield layers was 0.12 µm, the initial thickness of the lower insulated gap layer became 30 nm.

Like in the first embodiment, it is found that the optimum spin-valve giant magnetoresistive head that meets both requirements of magnetic reliability for preventing instability of MR output voltage waveform and electrical reliability for securing breakdown voltage has such a structure that the amount of over etching OE to 10 nm or less and the end-part inclined angle of the free magnetic layer is 45 degrees or more. The head structure as shown in FIG. 18 can also be realized in the manufacturing process using the mask pattern M1 with the resist-film thickness being 0.35 µm or less described in the first embodiment.

Figure 17:
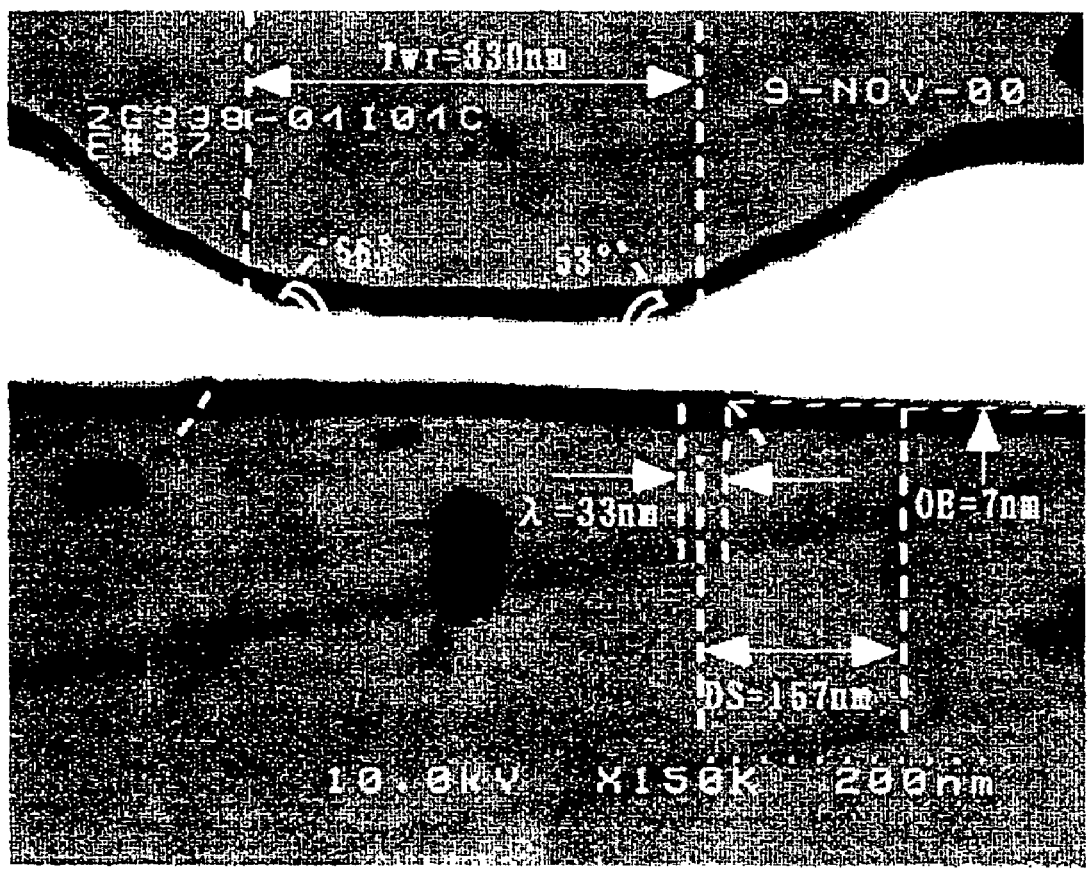
FIG. 17 is an exemplary scanning-electron microscopic photograph of a dual spin-valve giant magnetoresistive head according to a second preferred embodiment of the present invention, as seen from the side opposite to the recording media.

FIG. 17 shows a photograph of a dual spin-valve giant magnetoresistive head experimentally manufactured according to the manufacturing process shown in the first embodiment, the photograph taken with a scanning-electron microscopy from the air bearing surface of magnetic recording media. In this case, it was confirmed that the inclined angles of the end parts of the free magnetic layer in the multiple thin films of GMR sensor were 53 and 56 degrees, and the amount of over etching OE was 7 nm. Further, the dual spin-valve giant magnetoresistive head achieved about 5% of breakdown defect rate in such condition that the Barkhausen noise defect rate was about 5%.

Furthermore, in the embodiment, the horizontal distance DS between such a position that the thickness of the flat part of the magnetic-domain control layer becomes 99% and the end parts of the side faces in the middle line of the free magnetic layer was 157 nm. According to the embodiment, it is preferable that the distance DS is 200 nm or less.

(Third Embodiment)

This embodiment is to use only a resist film 17 to form a mask pattern in the manufacturing process as shown in the first and second embodiments. The thickness of the resist film 17 is within a range of between 0.1 and 0.35 µm, and the mask pattern M3 can be formed in such an undercut shape that each lower part up to 0.05 µm in height from the bottommost face of the resist film 17 intrudes 0.05 to 0.15 µm inwardly in depth in parallel with the substrate.

The resist material forming the mask pattern M3 can be a photoresist capable of pattern formation of a 0.35 µm or less thin film. For example, a resist having the property of permitting patterning with an exposure wavelength of 365 nm, 248 nm or 193 nm, or a resist having the property of permitting patterning with an electron beam.

The electron-beam lithography and the photolithography can also be used in combination. For example, a resist having the property of permitting patterning with a combination of the exposure wavelength of 365 nm and the electron beam, or a combination of the exposure wavelength of 248 nm and the electron beam can be used.

(Fourth Embodiment)

This embodiment is to use an organic film 14, an inorganic film 18 and a resist film 15 to form a mask pattern in the manufacturing process as shown in the first and second embodiments.

Figure 5:
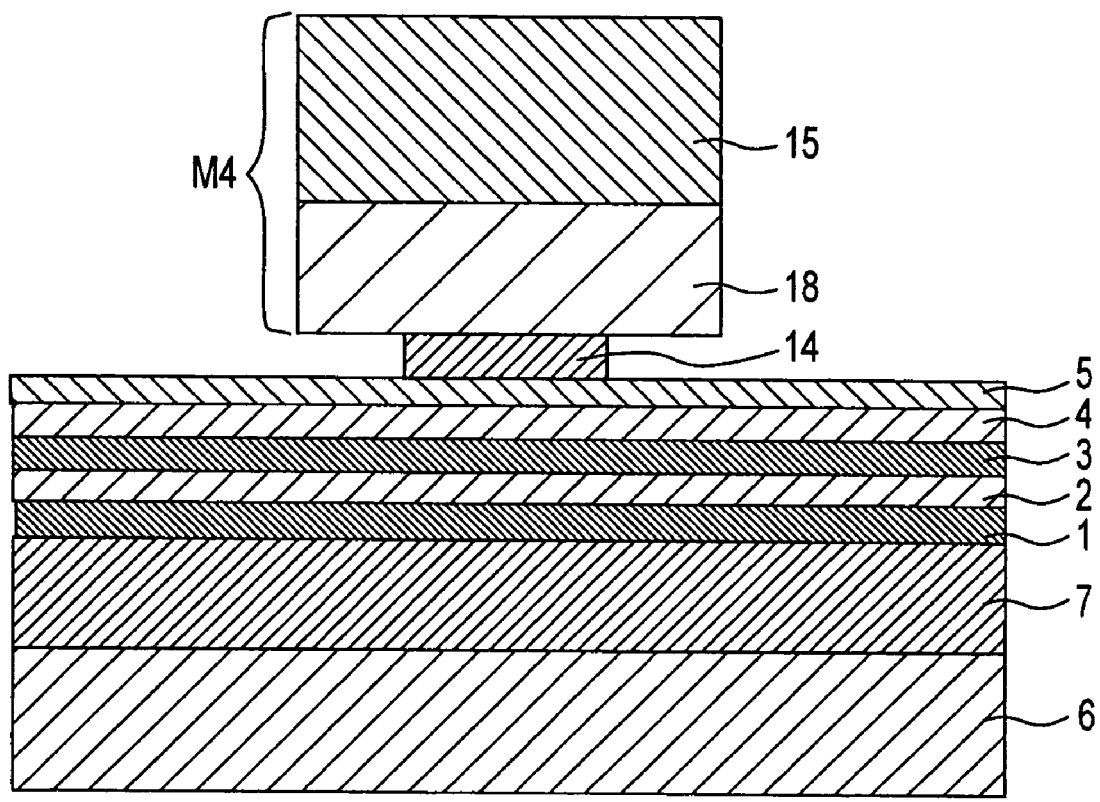
FIG. 5 is a cross-sectional view illustrating the process of forming a resist mask pattern in the manufacture of the spin-valve giant magnetoresistive heads as shown in FIGS. 1 and 18.

As shown in FIG. 5, a 0.01 to 0.05 µm thick organic film 14 is formed on the nonmagnetic protective layer 5. Then, a 0.1 to 0.3 µm thick inorganic film 18, made of $SiO_2$, $Al_2O_3$, $Si_3N_4$ or the like, is formed by ion spattering on the organic film 14. Then, a 0.1 to 0.35 µm thick resist film 15 is formed on the inorganic film 18. The resist film 15 is patterned by exposure and developing treatment to form a desired resist mask pattern. Uncovered portions of the inorganic film 18 other than those covered with the mask pattern are etched by reactive ion etching. Portions of the organic film 14 uncovered by the etching of the inorganic film 18 are removed by plasma ashing or the like to form the mask pattern in such an undercut shape that the organic film 14 directly under the inorganic film 18 intrudes 0.5 to 0.15 µm inwardly. Thus a desired mask pattern M4 is formed. At this time, the amount of inward intrusion can be controlled according to how long the ashing process lasts.

The resist material forming the mask pattern M4 can be a photoresist capable of pattern formation of a 0.35 µm or less thin resist film. For example, a resist having the property of permitting patterning with an exposure wavelength of 365 nm, 248 nm or 193 nm, or a resist having the property of permitting patterning with an electron beam.

The electron-beam lithography and the photolithography can also be used in combination. For example, a resist having the property of permitting patterning with a combination of the exposure wavelength of 365 nm and the electron beam, or a combination of the exposure wavelength of 248 nm and the electron beam can be used.

As described above, according to the present invention, the amount of etching of the lower insulated gap layer, which is produced in the process of patterning the multiple thin films of GMR sensor in a trapezoidal cross-sectional shape is 10 nm or less. Further, the magnetic-domain control layers and the conductive layers are formed on both sides of the multiple thin films of GMR sensor, and the angle which the tangent line of each side face of the multiple thin films of GMR sensor to the middle line of the free magnetic layer in its thickness direction forms with respect to the middle line of the free magnetic layer is 45 degrees or more. This structure makes it possible to provide such a spin-valve giant magnetoresistive head that it meets both the requirements of magnetic reliability and electrical reliability for securing constant breakdown voltage and preventing instability of MR output voltage waveform.

We claim:

1. A method of manufacturing a spin-valve giant magnetoresistive head comprising the steps of:
   forming a lower shield layer on a substrate;
   forming a lower insulated gap layer on said lower shield layer;
   forming multiple thin films on said lower insulated gap layer, said multiple thin films including an antiferromagnetic layer, a pinned magnetic layer, a nonmagnetic conductive spacer, a free magnetic layer and a nonmagnetic protective layer;
   forming a desired resist mask pattern on said multiple thin films with an organic film exhibiting a thickness within the range of 0.01 to 0.05 µm and a resist film exhibiting a thickness within the range of 0.1 to 0.35 µm;
   etching uncovered portions of said multiple thin films under openings of said resist mask pattern to pattern said multiple thin films into multiple thin films of GMR sensor;
   forming magnetic-domain control layers and conductive layers at both ends of said multiple thin films of GMR sensor; and
   removing said resist mask pattern to lift off said magnetic-domain control layers and said conductive layers.

2. The method according to claim 1, wherein said resist film has the property of permitting resist patterning using light with an exposure wavelength of 365 nm.

3. The method according to claim 1, wherein said resist film has the property of permitting resist patterning using light with an exposure wavelength of 248 nm.

4. The method according to claim 1, wherein said resist film has the property of permitting resist patterning using light with an exposure wavelength of 193 nm.

5. The method according to claim 1, wherein said resist film has the property of permitting resist patterning using an electron beam.

6. The method according to claim 1, wherein said resist film has the property of permitting resist patterning using light with an exposure wavelength of 365 nm and an electron beam in combination.

7. The method according to claim 1, wherein said resist film has the property of permitting resist patterning using light with an exposure wavelength of 248 nm and an electron beam in combination.

8. The method according to claim 1, wherein said resist film has the property of permitting resist patterning using an electron beam, the resist mask pattern having a trapezoidal cross-sectional shape with an angle of three degrees or more which each side face of said resist film forms with respect to the vertical direction.

9. The method according to claim 1, wherein said resist film has a first width and a second width in a direction parallel to a read track width; and
wherein said first width is larger than said second width, and said first width is closer to said multiple thin film than said second width.

10. The method according to claim 9, wherein an angle formed between edges of said first and second width and a direction of the thicknesses of said multiple thin films is three degrees or more.

11. The method according to claim 1, wherein during said etching said multiple thin films are etched such that an angle which a tangent line of each side end face of said multiple thin films to a middle line of the free magnetic layer in its thickness direction forms with respect to the middle line of the free magnetic layer is 45 degrees or more.

12. The method according to claim 11, wherein said resist film has the property of permitting resist patterning using light with an exposure wavelength of 365 nm, the resist film having a trapezoidal cross-sectional shape with an angle of three degrees or more which each side face of said resist film forms with respect to the vertical direction, and wherein an upper surface of the resist film in smaller than a lower surface of the resist film.

13. The method according to claim 11, wherein said resist film has the property of permitting resist patterning using light with an exposure wavelength of 248 nm, the resist film having a trapezoidal cross-sectional shape with an angle of three degrees or more which each side face of said resist film forms with respect to the vertical direction, and
wherein an upper surface of the resist film is smaller than a lower surface of the resist film.

14. The method according to claim 11, wherein an end point detector equipment controls the amount of etching during etching of said multiple thin films.

* * * * *